United States Patent [19]

Hanson et al.

[11] Patent Number: 5,579,648
[45] Date of Patent: Dec. 3, 1996

[54] METHOD OF MONITORING A TRANSPORT REFRIGERATION UNIT AND AN ASSOCIATED CONDITIONED LOAD

[75] Inventors: Jay L. Hanson, Bloomington; Doyle G. Herrig, Elko, both of Minn.

[73] Assignee: Thermo King Corporation, Minneapolis, Minn.

[21] Appl. No.: 425,024

[22] Filed: Apr. 19, 1995

[51] Int. Cl.⁶ ........................................... F25B 49/02
[52] U.S. Cl. .................................... 62/126; 62/131
[58] Field of Search ........................... 62/126, 125, 127, 62/129, 131, 160, 229, 157, 158

[56] References Cited

U.S. PATENT DOCUMENTS

| | | | |
|---|---|---|---|
| 4,211,089 | 7/1980 | Mueller et al. | 62/131 X |
| 4,381,549 | 4/1983 | Stamp, Jr. et al. | 62/160 X |
| 4,790,143 | 12/1988 | Hanson | 62/126 |
| 4,939,909 | 7/1990 | Tsuchiyama et al. | 62/126 X |
| 4,949,550 | 8/1990 | Hanson | 62/126 |
| 5,042,264 | 8/1991 | Dudley | 62/131 X |
| 5,161,384 | 11/1992 | Hanson et al. | 62/126 |
| 5,172,561 | 12/1992 | Hanson et al. | 62/127 |
| 5,201,186 | 4/1993 | Hanson | 62/126 |
| 5,222,368 | 6/1993 | Hanson | 62/126 |

Primary Examiner—Harry B. Tanner

[57] ABSTRACT

A method of monitoring and protecting a transport refrigeration unit and a load in a load space to be conditioned by circulating air between the load space and the transport refrigeration unit. The transport refrigeration unit maintains a selected set point temperature SP in the load space by electrical control which selects cooling and hot gas heating conditioning modes initiated by switching a three-way valve between first and second positions. The method includes the step of detecting a reverse operating mode, wherein the actual conditioning mode is the opposite of the conditioning mode requested by the control means, and the step of pulsing the three-way valve in an attempt to cause the three-way valve, when stuck, to switch to the required position.

12 Claims, 11 Drawing Sheets

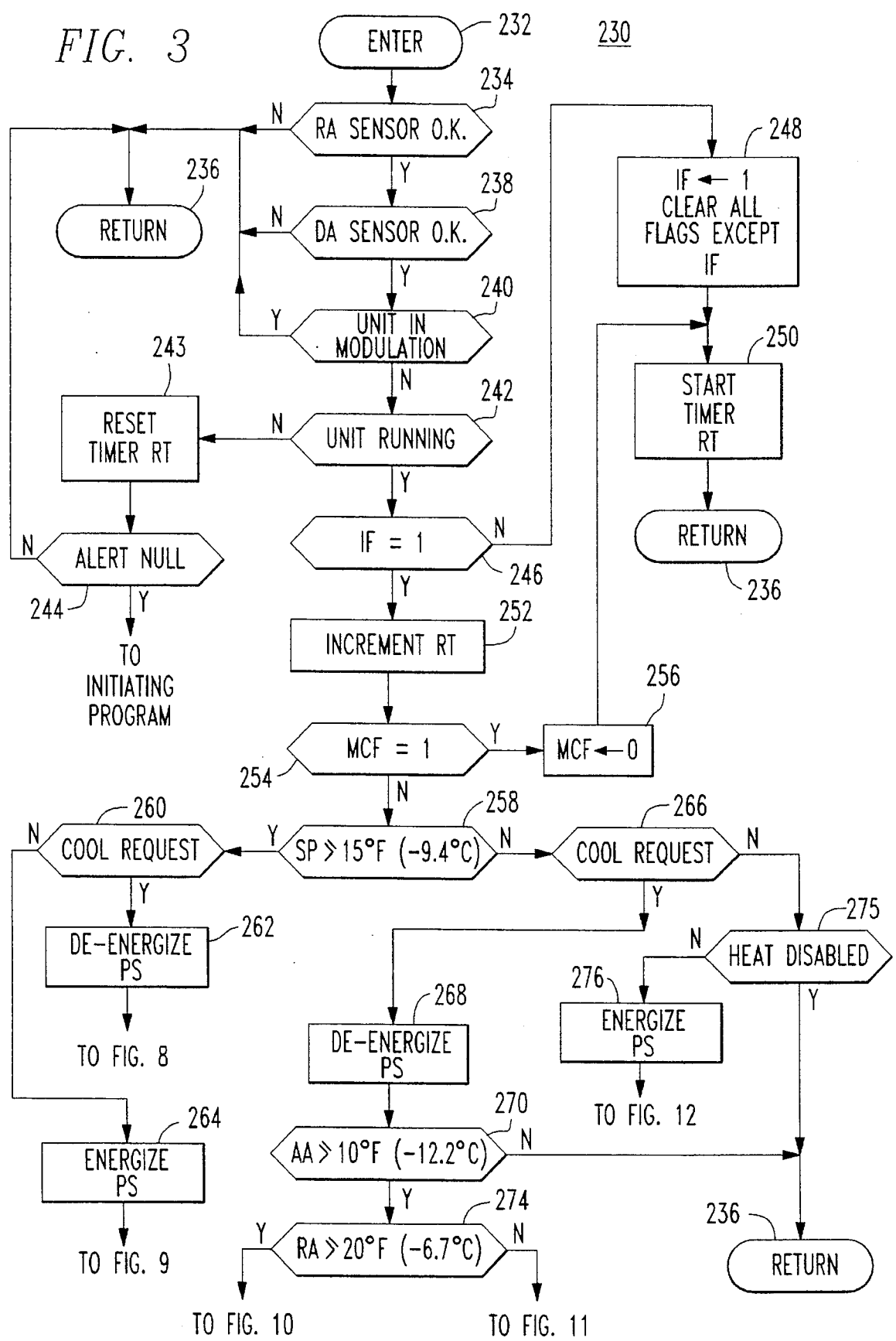

| RAM MAP | |
|---|---|
| RA | * RETURN AIR SENSOR |
| DA | * DISCHARGE AIR SENSOR |
| IF | * INITIALIZATION FLAG |
| MCF | * MODE CHANGE FLAG |
| RT | * TIMER |
| AA | * AMBIENT TEMPERATURE |
| COUNT | * COUNTER |
| ΔT | * DA-RA |
| NT | * NULL TIMER |
| FCMF | * FORCED CYCLE MODE FLAG |

*FIG. 4*

| RAM MAP ALARM CODES | |
|---|---|
| CHC | * CHECK HEAT |
| CCC | * CHECK COOL |
| OHN | * OVER HEAT NULL |
| OCN | * OVER COOL NULL |
| LHC | * LOW HEAT SHUTDOWN |
| LCC | * LOW COOL SHUTDOWN |
| OH | * OVER HEAT SHUTDOWN |
| OC | * OVER COOL SHUTDOWN |

*FIG. 5*

METHOD OF MONITORING A TRANSPORT REFRIGERATION UNIT AND AN ASSOCIATED CONDITIONED LOAD

TECHNICAL FIELD

The invention relates in general to transport refrigeration units, and more specifically to methods of monitoring transport refrigeration units which are required to reliably operate for long periods of time without supervision.

BACKGROUND ART

U.S. Pat. Nos. 5,201,186 and 5,222,368, which are assigned to the same assignee as the present application, disclose methods for detecting conditions which may cause shut down of a refrigeration unit, such as a transport refrigeration unit. When such a condition is detected, steps are taken to modify the operation of the refrigeration unit in an attempt to find an operating condition which will prevent, or at least delay, mandatory shut down. When mandatory shut down is still found to be required, an alarm code is stored which identifies the cause of shut down, and an alarm is generated which notifies a person in charge of the refrigeration unit, such as the driver of a truck or tractor-trailer unit which the refrigeration unit is associated with.

Certain types of refrigeration units, however, are required to reliably operate for relatively long periods of time without an attendant, such as transport refrigeration units which are associated with containers carried by rail. Application Ser. No. 245,266, filed May 18, 1994, which is assigned to the same assignee as the present application, is directed to improvements in such rail carried transport refrigeration units. The improvements include monitoring a predetermined parameter of the refrigeration unit. The refrigeration unit is shut down in the event the monitored parameter reaches a mandatory shut down condition, and a shut down count is incremented. The predetermined parameter is monitored during the forced shut down, and when the predetermined monitored parameter has a value which permits restarting of the refrigeration unit, the refrigeration unit is restarted when the value of the shut down count is less than a predetermined value. When restarted, the operation of the refrigeration unit is modified, with the modification being selected to reduce the probability of the monitored parameter reaching the predetermined shut down condition. In one embodiment, the high pressure side of the refrigeration unit is monitored. A shut down and subsequent re-start due to high pressure is accompanied by a modification in the operation of the refrigeration unit to reduce the load on the compressor. In another embodiment, the compressor is driven by an internal combustion engine monitored by a temperature sensor. In the event of a shut down and re-start due to an over-temperature condition of the engine, the operation of the refrigeration unit is modified to reduce the load on the engine.

An object of the present invention is to provide apparatus and methods which improve the reliability of transport refrigeration units which operate unattended for long periods of time, such as the hereinbefore mentioned container units which are carried by rail. Another object of the invention is to prevent or delay a mandatory shut-down due to reduced cooling and/or heating capacity of the unit. Still another object of the invention is to prevent or delay a mandatory shutdown due to the unit being stuck in a cooling mode, or stuck in a heating mode.

SUMMARY OF THE INVENTION

Briefly, the present invention includes a method of monitoring and protecting a transport refrigeration unit and a load in a load space to be conditioned by circulating air between the load space and the transport refrigeration unit. The transport refrigeration unit maintains a selected set point temperature SP in the load space by electrical control which selects cooling and hot gas heating conditioning modes initiated by switching a three-way valve to first and second positions. The method includes the steps of detecting the temperature DA of air discharged into the load space by the transport refrigeration unit, detecting the temperature RA of air returning to the transport refrigeration unit from the load space, detecting a request by the electrical control to change conditioning modes, and providing a predetermined time delay after each detection of a request to change conditioning modes.

The method then includes the steps of determining the actual conditioning mode of the transport refrigeration unit, after the predetermined time delay, in response to the current values of DA and RA, comparing the actual conditioning mode with the requested conditioning mode to determine if the actual conditioning mode is consistent with the requested conditioning mode, and pulsing the three-way valve in response to the comparison step finding that the actual conditioning mode is inconsistent with the requested conditioning mode. This may free the three-way valve, if stuck, allowing it to switch to the requested position, and preventing a shut-down of the transport refrigeration unit.

In one embodiment of the invention, the method further includes the steps of stopping the transport refrigeration unit in response to the comparison step finding that the actual conditioning mode is inconsistent with the requested conditioning mode, and re-starting the transport refrigeration unit after a predetermined time delay, with the step of pulsing the three-way valve following the step of re-starting the transport refrigeration unit.

In another embodiment of the invention, the pulsing of the three-way valve is initiated without first stopping the transport refrigeration unit.

BRIEF DESCRIPTION OF THE DRAWINGS

The invention will become more apparent by reading the following detailed description in conjunction with the drawings, which are shown by way of example only, wherein:

FIG. 3 is a detailed flow diagram of a program which selects a proper diagnostic and shutdown program to be run in response to the selected operating mode of the unit and predetermined external parameters;

FIG. 4 is a RAM map listing sensor readings, program flags, counters, timers and other program variables, utilized during the running of the application programs shown in FIGS. 3 and 8–12;

FIG. 5 is a RAM map illustrating alarm codes which are generated during the running of the application programs shown in FIGS. 3 and 8–12;

DESCRIPTION OF PREFERRED EMBODIMENTS

Figure 1:
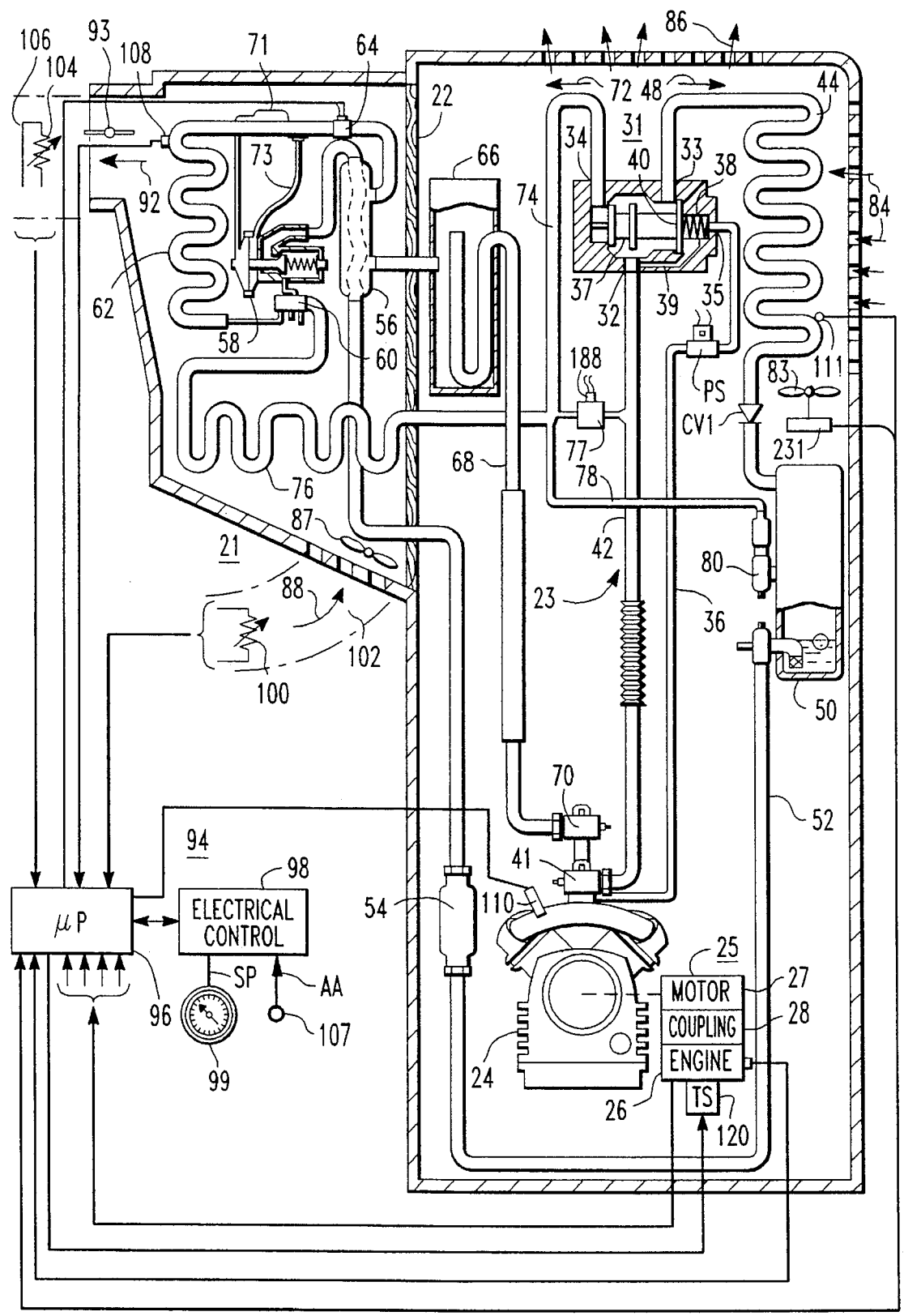
FIG. 1 is a schematic piping and wiring diagram of a refrigeration unit which may be operated according to the teachings of the invention.

Referring now to the drawing, and to FIG. 1 in particular, there is shown a transport refrigeration unit 20 which may utilize the teachings of the invention. Transport refrigeration unit 20 controls the temperature of a conditioned load space 21 to a predetermined temperature range adjacent to a selected set point temperature SP. Transport refrigeration unit 20, for example, may be mounted on a container, truck, or trailer, such as on a wall 22 thereof. Transport refrigeration unit 20 has a closed fluid refrigerant flow path 23 which includes a refrigerant compressor 24 driven by a prime mover arrangement 25.

Prime mover arrangement 25 includes an internal combustion engine 26, such as a diesel engine. Prime mover arrangement 25 may optionally include a stand-by electric motor 27. Engine 26 and motor 27, when both are utilized, are coupled to compressor 24 by a suitable clutch or coupling 28 which disengages engine 26 while motor 27 is operative. Engine 26 is selectively operable at one of at least first and second operating speeds, called high and low speed, respectively, which, for example, may be 2200 RPM and 1400 RPM.

Transport refrigeration unit 20 includes a three-way valve 31 which has an inlet port 32 and first and second outlet ports 33 and 34, respectively. Three-way valve 31 directs refrigerant flow from compressor 26 from inlet port 32 to the first outlet port 33 during a cooling conditioning mode or cycle of unit 20, and from inlet port 32 to the second outlet port 34 during a hot gas heating conditioning mode or cycle, which also includes a hot gas defrost mode or cycle.

Three-way valve 31 includes a pressure control port 35 which is connected to the low pressure side of the transport refrigeration unit 20, such as to the low pressure side of compressor 24, via a conduit 36 and a pilot solenoid valve PS. Pilot solenoid valve PS closes conduit 36 when de-energized, and it opens conduit 36 when energized.

Three-way valve 31 includes an axially slidable piston 37 which is biased by a spring 38 to select the cooling position of three-way valve 31 when unit 20 is off, ie., piston 37 is biased towards the left-hand side of FIG. 1.

When unit 20 is running and pilot solenoid valve PS is de-energized, conduit 36 is closed and a small portion of the high pressure refrigerant entering the inlet port 32 is directed to the spring biased side of piston 37 via a bleed hole 39. This extra pressure aids spring 38 in maintaining three-way valve 31 in the cooling position.

When pilot solenoid PS is energized to open conduit 36, pressure on the spring biased side of piston 37 flows to the low pressure side of the transport refrigeration unit 20. The pressure on the non-spring biased side of piston 37, called the back side 40, overcomes the spring force of spring 38, causing piston 37 to move towards the right-hand side of FIG. 1, closing refrigerant flow to the first outlet port 33 and allowing refrigerant to flow to the second outlet port 34. Pressure against the back side 40 of piston 37 is trapped in a condenser coil 44 connected to the first outlet port 33, to maintain pressure force against the back side 40 of piston 37. A small amount of refrigerant continues to flow to the low side of the system via the bleed hole 39, but the primary flow is from inlet port 32 to the second outlet port 34.

Refrigerant flow to the second outlet port 34 continues until pilot solenoid PS is de-energized, closing conduit 36. This action allows pressure to build up on the spring biased side of piston 37, moving piston 37 in a direction which closes the second outlet port 34 and opens the first outlet port 33.

Discharge ports of compressor 24 are connected to the inlet port 32 of three-way valve 31 via a discharge service valve 41 and a hot gas line 42.

When three-way valve 31 selects the cooling cycle outlet port 33, it connects compressor 24 in a first refrigerant flow path 48, which, in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, a controllable suction line modulation valve 64, another path through heat exchanger 56, an accumulator 66, a suction line 68, and back to a suction port of compressor 24 via a suction line service valve 70. Expansion valve 58 is controlled by a thermal bulb 71 and a pressure equalizer line 73.

The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired.

When three-way valve 31 selects the heating cycle outlet port 34, it connects compressor 24 in a second refrigerant flow path 72. The second refrigerant flow path 72 by-passes condenser coil 44 and expansion valve 58, connecting the hot gas output of compressor 24 to the refrigerant distributor 60 via a hot gas line 74 and a defrost pan heater 76. A hot gas by-pass solenoid valve 77 may optionally be disposed between hot gas line 42 and hot gas line 74 to controllably inject hot refrigerant gas into hot gas line 74 during a cooling cycle. A by-pass or pressurizing line 78 connects hot gas line 74 to receiver 50 via by-pass and check valves 80, to force refrigerant from refrigerant receiver 50 into an active refrigerant flow path during hot gas heating and defrost cycles.

A condenser fan or blower 83, which has selectable low and high operating speeds, causes ambient air 84 to flow through condenser coil 44, with the resulting heated air 86 being discharged to the atmosphere. An evaporator fan or blower 87 draws air 88, called "return air", from conditioned space 21, through the evaporator coil 62, and the resulting cooled or heated air 92, called "discharge air", is returned to conditioned space 21. During an evaporator defrost cycle a defrost air damper 93 may be operated to close the discharge air path to the conditioned space 90.

Transport refrigeration unit 20 is controlled by electrical control 94 which includes a microprocessor based controller 96 and electrical control circuits and components 98. Electrical control circuits and components 98 include relays, solenoids, and the like, and will be explained relative to FIGS. 2A and 2B. Controller 96 receives input signals from a plurality of devices, including inputs from: a set point temperature selector 99 which may be manually actuated to select the desired temperature SP of conditioned load space 21; a return air temperature sensor 100 disposed in a suitable return air path 102; a discharge air temperature sensor 104 disposed in a suitable discharge air path 106; an ambient air temperature sensor 107, which provides an input temperature signal AA in response to the ambient air 84; a coil temperature sensor and switch 108 disposed to sense the temperature of the evaporator coil 62; a refrigerant pressure sensor or high pressure cut out (HPCO) 110 disposed on the high pressure side of the refrigerant flow path 48; and a condenser coil temperature sensor 111. The high pressure side of refrigeration unit 20 extends from the discharge side of compressor 24 to expansion valve 58, and thus, for example, pressure sensor 110 may be disposed on a discharge manifold of compressor 24, as illustrated. The low pressure side of refrigeration unit 20 extends from evaporator coil 62 to the suction side of compressor 24.

Figure 2A:
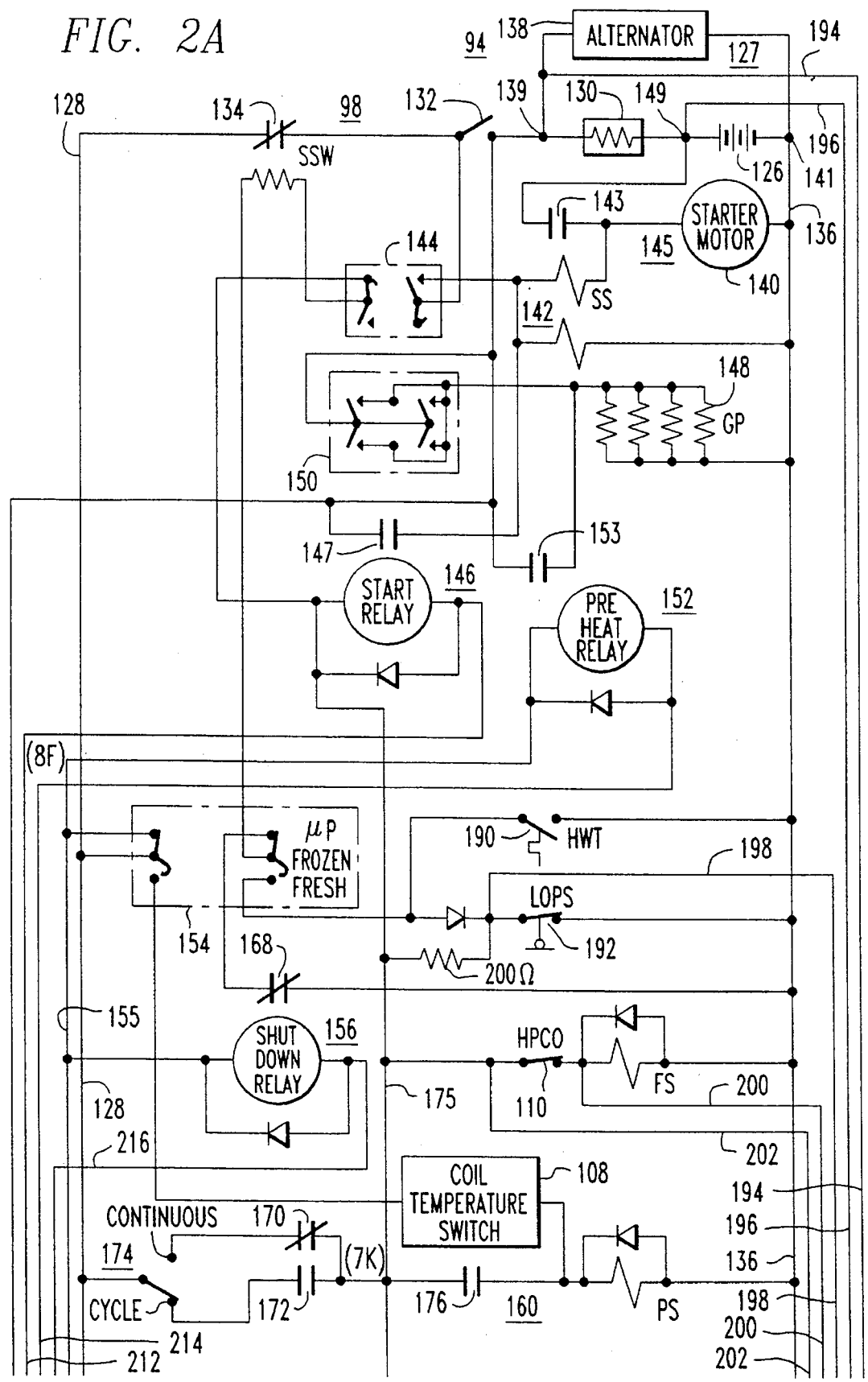
FIGS. 2A and 2B, when assembled, provide a detailed schematic diagram of electrical control shown in block form in FIG. 1.
Figure 2B:
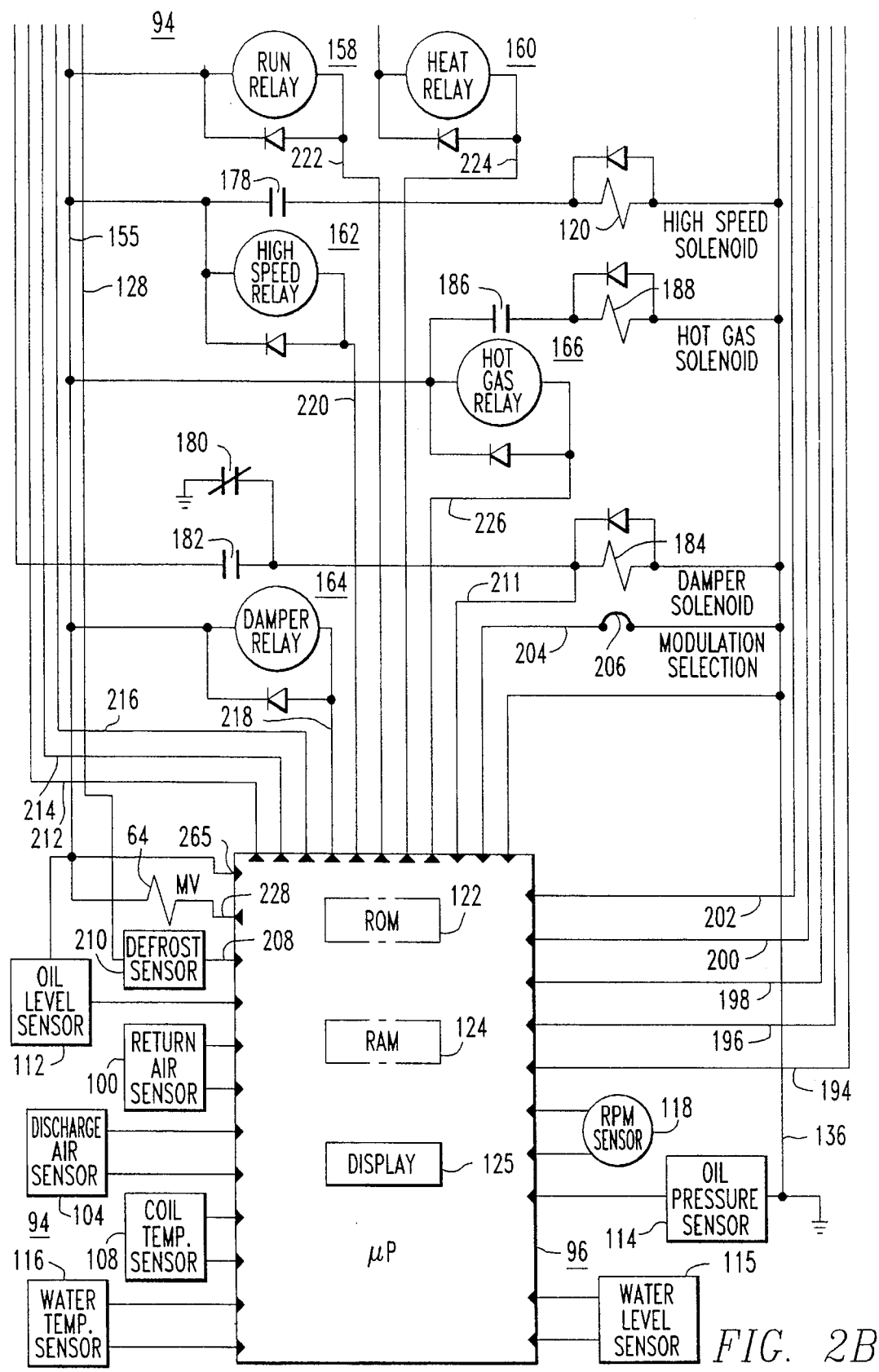

FIGS. 2A and 2B, when assembled, provide a detailed schematic diagram of electrical control 94, which includes controller 96 and electrical control 98. Electrical control 94 receives inputs from various engine sensors, such as engine coolant level sensor 112, oil pressure sensor 114, engine coolant temperature sensor 116, and engine speed or RPM sensor 118.

Controller 96, among other things, controls hot gas valve 77, a throttle or high speed solenoid 120 which selects the hereinbefore mentioned high and low operating speeds of engine 30, and the magnitude of current flow through a control coil associated with modulation valve 64.

Controller 96 includes a read-only memory (ROM) 122 for storing application specific programs to be hereinafter described, and a random-access memory (RAM) 124 for storing software timers, program flags, counters, input signals, output signals, and other program variables generated by the application specific programs. Controller 96 also includes a display 125 for displaying alarm or fault codes, for continuously illuminating, or flashing, an alarm icon or indicator, for displaying system status via status lights, and the like, such as described in U.S. Pat. No. 5,123,251, which is assigned to the same assignee as the present application.

Electrical control circuits and components 98 include a source of potential or power supply 127 having first and second conductors 128 and 136, respectively. Power supply 127 includes a battery 126 which has one side connected to the first power supply conductor 128 via a DC current measuring shunt 130 which measures battery charge and discharge current. Control 98 further includes an on-off switch 132, and normally closed contacts 134 of a protective reset switch SSW. The remaining side of battery 126 is connected to the second power supply conductor 136, which is grounded. Power supply 127 further includes a generator or alternator 138 driven by prime mover arrangement 25, with the generator or alternator 138 being connected from a junction point 139 between switch 132 and current shunt 130 to a junction point 141 on grounded conductor 136. Junction points 139 and 141 form output terminals of power supply 127 which provide a voltage and current to the circuits and components connected thereto.

Control 98 also includes engine starting apparatus 145 for engine 26, with engine starting apparatus 145 having a portion which is connected directly to battery 126, e.g., to a junction point 149 between battery shunt 130 and battery 126, and a portion which is connected to power supply output terminal 139. The portion of engine starting apparatus 145 which is connected to junction point 149 includes a starter motor 140 which is controlled by a starter solenoid 142 having associated normally open contacts 143, an ignition switch 144, and a start relay 146 having associated normally open contacts 147. The portion of starting apparatus 145 which is connected to power supply output terminal 139, to enable current draw to be measured by the battery shunt 130, includes engine pre-heat control, including glow plug resistors (GP) 148, a pre-heat switch 150 and normally open contacts 153 of a pre-heat relay 152.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places transport refrigeration unit 20 under control of controller 96. The upper position provides voltage from power supply conductor 128 to a conductor 155. An intermediate position of switch 154, in which the center terminal is not connected to either the upper terminal or the lower terminal, is selected when controller 96 is not utilized and the load in the conditioned load space 21 is frozen. This switch position will cause unit 20 to operate continuously in a low speed cool mode LSC. The lower position of switch 154 is selected when controller 96 is not utilized and the load in conditioned load space 21 is non-frozen. This position of switch 154 will cause unit 20 to operate continuously, switching between heating and cooling modes or cycles under the control of the hereinbefore mentioned evaporator coil temperature sensor and switch 108. Evaporator coil temperature sensor and switch 108 is preset to close at a predetermined coil temperature, such as 35 degrees F. (1.7° C.), to energize the pilot solenoid PS and initiate a heating cycle, and to open at a predetermined higher temperature, such as 38° F. (3.3° C.), to de-energize pilot solenoid PS and initiate a cooling cycle.

Figure 6:
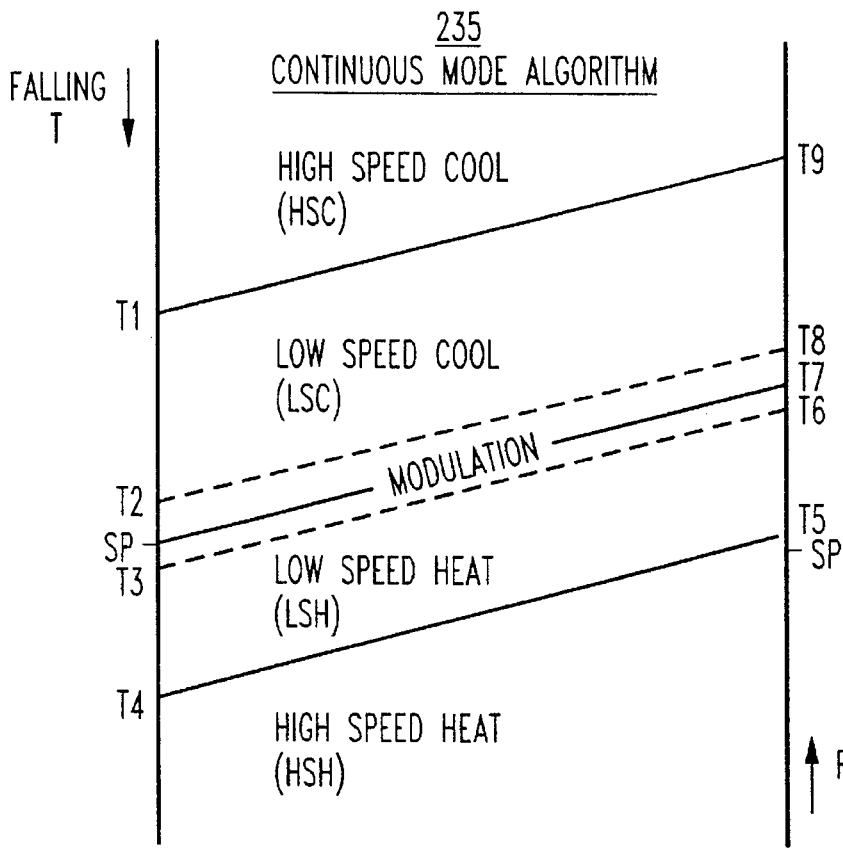
FIG. 6 is a typical temperature control algorithm for a continuous operating mode which may be used by the transport refrigeration unit of the invention.
Figure 7:
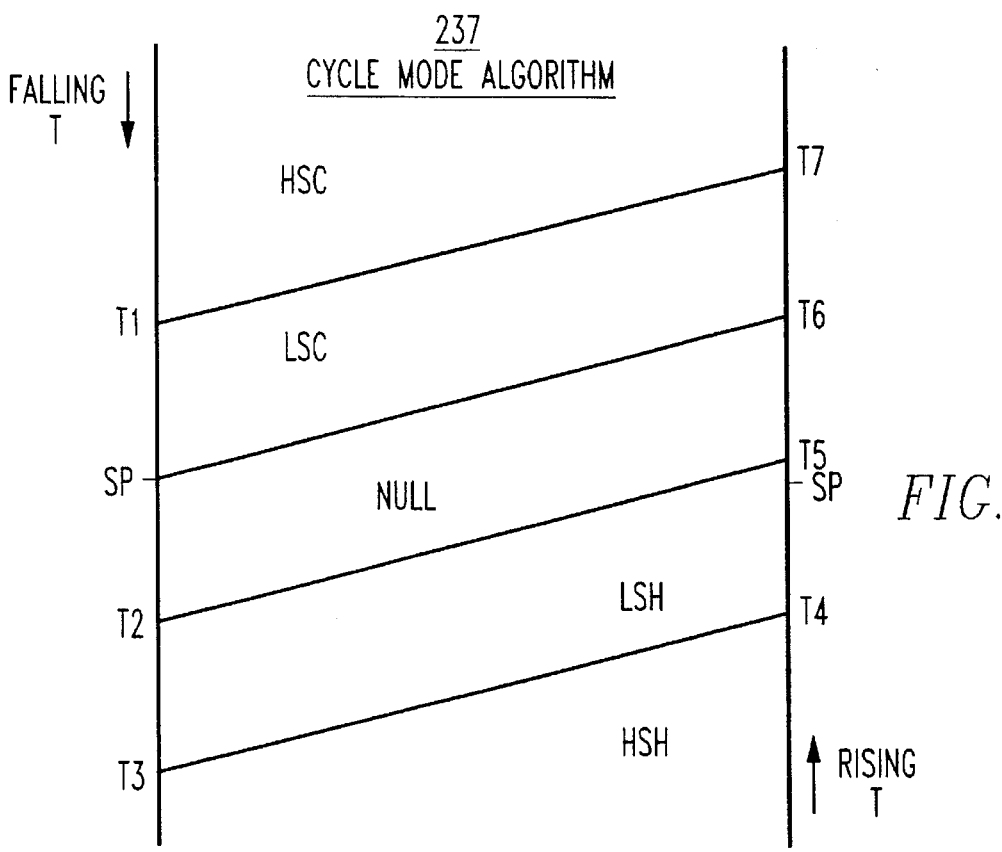
FIG. 7 is a typical temperature control algorithm for a start-stop cycling operating mode which may be used by the transport refrigeration unit of the invention.

In addition to the control devices or relays already mentioned, control 98 includes control devices in the form of a shutdown relay 156, a run relay 158, a heat relay 160, a high speed relay 162, a defrost damper relay 164, and a hot gas relay 166. Shutdown relay 156 is normally energized, and is de-energized to shut transport refrigeration unit 20 down via its associated set of normally-closed contacts 168 which ground the protective switch SSW and cause it to open its contacts 134. Run relay 158 has normally open contacts 172 connected to an operating mode selector switch 174 which has an input connected to conductor 128. Selector switch 174 selects either: (1) a continuous operating mode in which a prime mover of arrangement 25 operates continuously; or, (2) a cycling start-stop operating mode, which includes starting and stopping a prime mover of the prime mover arrangement 25. FIGS. 6 and 7 respectively illustrate typical temperature control algorithms for implementing continuous and cycle operating modes.

Contacts 172 of run relay 158 provide voltage to a conductor 175 from conductor 128 and mode selector switch 174. Run relay 158 must be energized to enable the starting and running of refrigeration unit 20 via internal combustion engine 30.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 93. Hot gas relay 166 is provided for controlling the hot gas valve 77 via a set of normally open contacts 186 and a hot gas solenoid coil 188.

Control 98 also includes an engine coolant temperature switch (HWT) 190, which closes when the engine coolant reaches a predetermined elevated temperature, and a low oil pressure switch (LOPS) 192 which is open as long as engine oil pressure is normal. The closing of either switch 190 or 192 will shut unit 20 down via the manual reset switch SSW.

Controller 96 senses the voltage across the battery shunt 130 via conductors 194 and 196, and can thus determine the magnitude and polarity of battery current. One polarity, which will be called positive, indicates the battery 126 is being charged by alternator 138, and also indicates that a compressor prime mover of prime mover arrangement 25 is running. The other polarity, ie., negative, indicates battery 126 is discharging.

Controller 96 also has a conductor 198 which senses the position of the low oil pressure switch 192, conductors 200 and 202 which sense the voltage level on first and second sides, respectively, of the high refrigerant pressure cut-out switch 110, a conductor 204 which senses whether or not a suction line modulation valve selector jumper 206 has connected conductor 204 to system ground conductor 136, a conductor 208 which senses whether or not a defrost sensor switch 210 has operated, signifying the need for a defrost cycle, and a conductor 211 which detects voltage on the damper solenoid 184.

Controller 96 has a plurality of output conductors or drive lines for controlling the energization and de-energization of a plurality of control devices, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in a control coil associated with suction line modulation valve 64.

As the various functions performed by controller 96 are described, only those necessary for understanding the invention will be described in detail. Reference may be had to U.S. Pat. Nos. 5,123,252; 5,123,253; 5,140,825; and 5,140,826, which are assigned to the same assignee as the present application, for details relative to functions shown in block form.

FIGS. 3 is a flow diagram of a program 230 which functions to select one of five different diagnostic programs, based primarily upon the operating mode, heat or cool, requested by controller 96. In the case of a frozen load being conditioned in conditioned space 21, with controller 96 calling for the cooling conditioning mode, program 230 also checks the temperature AA of the ambient air, and the temperature RA of the return air. During the description of FIG. 3, as well as the descriptions of the diagnostic programs shown in FIGS. 8–12, RAM maps 231 and 233 shown in FIGS. 4 and 5, respectively, will also be referred to. RAM map 231 shown in FIG. 4 illustrates certain of the variables stored in RAM 124 during the operation of the various programs, including the latest sensor readings, flags, timers, and counters. RAM map 233 shown in FIG. 5 illustrates different alarm codes which are generated by the diagnostic programs of FIGS. 8–12 upon detecting certain operating conditions. FIGS. 6 and 7 will also be referred to during the following description of the application specific operating programs. FIG. 6 is a temperature control algorithm 235 which may be used by controller 96 when selector switch 174 is set to select the continuous operating mode, and FIG. 7 is a temperature control algorithm 237 which may be used by controller 96 when selector switch 174 is set to select the start-stop cycling mode. Operating modes and their trigger temperatures initiated by falling and rising temperatures in conditioned space are respectively indicated along the left and right-hand sides of the algorithms.

Returning to FIG. 3, program 230 is entered periodically at 232 and certain sensors essential to the operation of the diagnostic programs are checked to make sure they are operating properly. A sensor checking program shown in the hereinbefore mentioned U.S. Pat. No. 5,123,252 may be used to identify a faulty sensor. This sensor checking program sets certain sensor fail flags which identify faulty sensors, and these flags may be checked by program 230. For example, step 234 determines if the return air sensor 100 is faulty. The return air sensor 100 provides a return air temperature reading RA. If return air sensor 100 is faulty, step 234 exits program 230 at return 236. In like manner, step 238 determines if the discharge air temperature sensor 104 is faulty. The discharge air temperature sensor 106 provides a discharge air temperature reading DA. If discharge air sensor 104 is faulty, step 238 proceeds to the program return 236. In like manner, the ambient temperature sensor 107, which provides a temperature reading AA, may be checked.

When all sensors essential to proper diagnostic evaluation are found to be operating correctly, step 240 determines if unit 20 is operating with suction line modulation. When unit 20 is operating with suction line modulation it indicates that unit 20 is operating properly in a heat or cool temperature band close to the selected set point temperature SP, as illustrated in the continuous mode temperature control algorithm 235 shown in FIG. 6. Thus, when unit 20 is operating in suction line modulation, it is unnecessary to check for low heating and cooling capacity, and it is also unnecessary to determine if unit 20 is operating in a reverse mode, ie., in heat when controller 96 is requesting cool, or in cool when controller 96 is requesting heat. Besides, when unit 20 is operating with suction line modulation, the ΔT, determined by subtracting the temperature RA of the return air from the temperature DA of the discharge air, will be small, which may falsely trigger a low heating or low cooling capacity alarm. When step 240 finds that unit 20 is operating with suction line modulation, ie., with current flowing through the control coil of modulation valve 64, step 240 proceeds to the program return 236.

When the critical sensors are operating properly, and unit 20 is not operating with suction line modulation, step 240 proceeds to step 242 which determines if unit 20 is running. Unit 20 may be operating in a start-stop cycle mode, which enters a normal shut-down NULL mode in a temperature band adjacent to the set point temperature, as illustrated in the cycle mode temperature control algorithm 237 shown in FIG. 7. Unit 20 may also have been shut down by one of the diagnostic programs shown in FIGS. 8–12, as will be hereinafter described, with such a forced, but temporary, shutdown mode being called an ALERT NULL mode. When step 242 finds unit 20 not running, step 243 resets a timer RT, which is used in the diagnostic programs shown in FIGS. 8-12, and step 244 determines if unit 20 is in a normal NULL mode associated with cycle mode operation, or in an ALERT NULL mode. If unit 20 is in a normal NULL mode, step 244 proceeds to program return 236. If unit 20 is in an ALERT NULL mode, step 244 branches to a predetermined point in the diagnostic program which initiated the ALERT NULL mode, in order to update a null timer NT, as will be hereinafter described. Instead of utilizing the indicated position of step 242, step 242 may be repositioned such that it is entered as the first step of program 230, in order to insure that the null timer NT is updated, even after a sensor failure.

When step 242 finds unit 20 is running, step 246 checks an initialization flag IF, which will be a logic zero when unit 20 is initially started at the start of a new trip. When flag IF is found to be a logic zero, step 246 proceeds to step 248 which sets flag IF, and clears all other program flags. Step 250 then initializes or resets timer RT and step 250 proceeds to program return 236.

Upon each subsequent running of program 230 during this trip of unit 20, step 246 will now find flag IF is set, ie., a logic one, and step 246 then proceeds to step 252 which increments timer RT. Timer RT is reset at the start of each new trip, as just described, and when unit 20 is stopped for some reason, as described relative to step 243. Timer RT is also reset each time controller 96 changes the unit operating mode from a cool request to a heat request, and from a heat request to a cool request. The diagnostic programs of the invention continuously check for low cooling capacity and low heating capacity, as well as checking to insure that unit 20 actually switches operating modes in response to each request to change load conditioning modes by controller 96. When controller 96 requests a new operating mode, controller 96 also sets a mode change flag MCF. Step 254 checks flag MCF, and upon finding flag MCF set, step 254 proceeds to step 256, which resets flag MCF, and step 256 proceeds to step 250 which initializes timer RT. Upon initial start-up of unit 20, unit 20 will start in a cooling mode and no mode changes will be made by controller 96 until the temperature of conditioned space 21 has been pulled down to the selected set point temperature SP, as illustrated in the temperature control algorithms 235 and 237 of FIGS. 6 and 7, respectively. Thus, step 254 will find flag 254 will be reset during initial temperature pull down, and step 254 advances to step 258.

Step 258 determines the type of load being conditioned in conditioned space, with the load being classified as either a "fresh" load, or a "frozen" load, as the diagnostic programs of the invention are each tailored for a specific type of load. For purposes of example, it will be assumed that a set point SP which is equal to, or above, 15° F. (−9.4° C.), indicates a fresh load, and a set point SP which is below 15° F. (−9.4° C.) indicates a frozen load.

When step 258 finds the set point temperature SP is equal to, or above, 15° F. (−9.4° C.), step 260 determines whether controller 96 is requesting a cool operating mode or a heat operating mode. When controller 96 is requesting a cool operating mode, step 262 de-energizes pilot solenoid PS, and step 262 proceeds to a diagnostic program shown in FIG. 8. When controller 96 is requesting a heat operating mode, step 264 energizes pilot solenoid PS, and step 264 proceeds to a diagnostic program shown in FIG. 9.

When step 258 finds the set point temperature is below 15° F. (−9.4° C.), step 266 determines the mode requested by controller 96. When step 266 finds controller 96 is requesting a cool operating mode, step 268 de-energizes pilot solenoid PS and proceeds to step 270. Step 270 determines if the temperature AA of the ambient air 84 is below or above a predetermined value, such as 10° F. (−12.2° C.). If the temperature AA of the ambient air is below 10° F. (−12.2° C.), the ΔT will be too small to make accurate unit capacity checks, and step 270 proceeds to program return 236. When step 270 finds the temperature AA of the ambient air is equal to, or above, 10° F. (−12.2° C.), step 270 proceeds to step 274 which determines if the temperature RA of the return air 88 is below or above a predetermined value, such as 20° F. (−6.7° C.). The value of ΔT which indicates adequate unit cooling or heating capacity is less when the temperature RA of the return air is below 20° F. (−6.7° C.), and thus different diagnostic programs are used to check for low unit cooling capacity. When step 274 finds that the temperature RA of the return air 88 is equal to, or above 20° F. (−6.7° C.), step 274 proceeds to the diagnostic program shown in FIG. 10. When step 274 finds the temperature RA of the return air 88 is below 20° F. (−6.7° C.), step 274 proceeds to the diagnostic program shown in FIG. 11.

When step 266 finds controller 96 is requesting a heating mode, step 266 proceeds to step 275 which determines if the heating mode is necessary for this particular frozen load. When the nature of the frozen load is such that heat is not required, the heating mode is deliberately manually disabled by authorized personnel before the start of the trip. When step 275 finds that the heat mode has been disabled, step 275 proceeds to program return 236. When step 275 finds that the heat mode has not been disabled, step 275 proceeds to step 276. Step 276 energizes pilot solenoid PS, and step 276 proceeds to the diagnostic program shown in FIG. 12.

Figure 8:
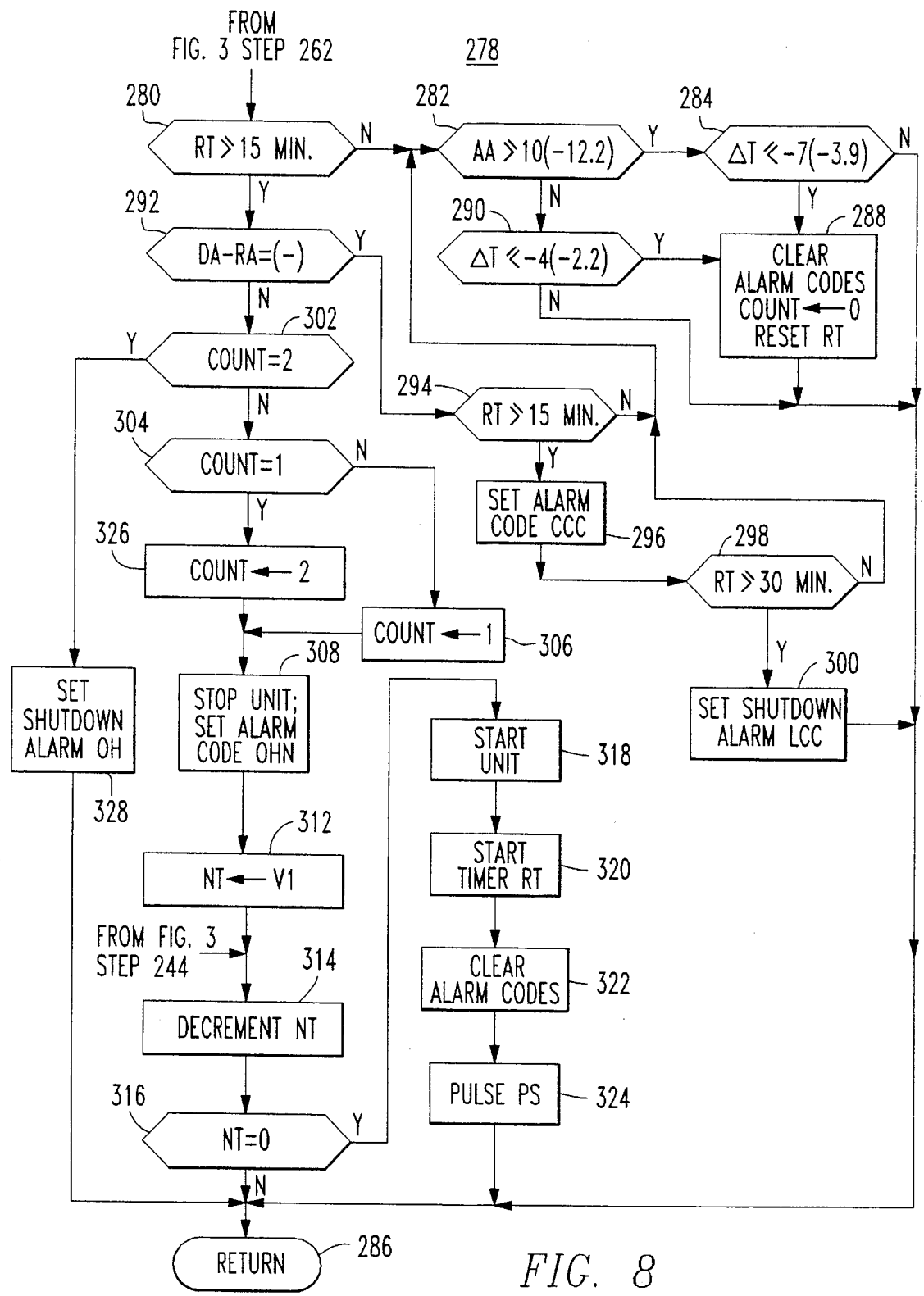
FIG. 8 is a flow diagram of a diagnostic program selected by the program selector shown in FIG. 3 when a fresh load is being conditioned and the controller is requesting a cooling cycle.

FIG. 8 illustrates a diagnostic program 278 which is selected by step 262 in FIG. 3 when a fresh load is being conditioned and controller 96 is requesting the cool operating mode. Step 280 checks timer RT maintained by program 230 of FIG. 3, to determine if the present operating mode has existed for a predetermined period of time, such as 15 minutes. The time is selected such that with normal unit cooling and heating capacity, the time selected will not be reached before controller 96 will require a change in operating mode. In a continuous mode, as illustrated in the temperature control algorithm of FIG. 6, reaching suction line modulation, when suction line modulation is enabled by jumper 206 in FIG. 2B, will suspend the diagnostics of the invention, as unit 20 is operating normally, maintaining conditioned space 21 in a desired temperature band adjacent to the selected set point temperature SP. When modulation is not selected, then unit 20 will change back and forth between cool and heat modes, each time re-initializing timer RT, with the normal time in any selected mode being less than the time selected for step 280. In a cycle mode, reaching NULL will suspend the diagnostics of the invention. Each time unit 20 is restarted following a NULL mode, unit 20 should normally operate in the selected cooling or heating mode for an interval less than the time selected for step 280.

Before timer RT reaches the time selected for step 280, e.g., 15 minutes, the achieving of a predetermined value of ΔT will signify adequate heating or cooling capacity, and with adequate heating and cooling capacity the present operating mode should change from heat to cool, or from cool to heat, or the unit will go into modulation, or into a NULL mode, any of which will stop timer RT before it reaches the value of step 280.

When step 280 finds timer RT has not reached 15 minutes, step 282 determines if the ambient temperature AA is above or below a predetermined temperature, such as 10° F. (−12.2° C.), in order to choose a proper value for ΔT for use in determining whether or not unit 20 possesses adequate cooling and/or heating capacity. When step 282 finds that the temperature AA is equal to, or above, 10° F. (−12.2° C.), step 284 determines if ΔT, which is calculated by subtracting the temperature RA from the temperature DA, is equal to, or less than a predetermined difference value, such as −7 when Fahrenheit is used, or −3.9, when Celsius is used. In the early part of the 15 minute period, the selected value for ΔT in step 284 will not have been reached, and step 284 proceeds to program return 286. With normal cooling capacity, the value for ΔT in step 284 will be reached within the 15 minute time period of step 280, and step 284 will branch to step 288 which clears any alarm codes which may have been set by diagnostic program 278, it resets a shutdown counter COUNT, which will be hereinafter described, and it resets timer RT. Program 278 has thus concluded that unit 20 is operating properly and continued diagnostics are not necessary until the mode requested by controller 96 is changed, or unit 20 has been stopped and re-restarted.

When step 282 finds the ambient temperature AA is below 10° F. (−12.2° C.), step 282 proceeds to step 290 which compares ΔT with a lower value, such as −4 when Fahrenheit is used, and −2.2 when Celsius is used. When the ΔT of step 290 is reached within 15 minutes, step 290 proceeds to step 288 to reset the diagnostic system, as unit 20 is operating normally.

Should unit 20 not reach the applicable ΔT within 15 minutes, step 280 proceeds to step 292 which determines if the problem is insufficient cooling capacity; or, if the problem lies in three-way valve 31 not responding properly when pilot solenoid valve PS was de-energized by step 262. In the latter situation, three-way valve 31 may be stuck in the heating position. As hereinbefore described, correct operation of three-way valve 31 requires the proper energization, or de-energization, of pilot solenoid PS, as well as proper response of three-way valve 31 to changes in pressure when pilot solenoid PS closes, or opens, conduit 36.

Step 292 may determine which of the two possible problems may be present, for example, by determining if the temperature DA of the discharge air is less than the temperature RA of the return air, signifying a cooling mode. Step 292 alternatively may check the algebraic sign of the latest calculation of ΔT, or step 292 may calculate the latest ΔT by subtracting the temperature RA from the temperature DA. If the algebraic sign is minus, unit 20 is in a cooling conditioning mode, and if the algebraic sign is plus, unit 20 is in a hot gas heating conditioning mode.

When step 292 determines that unit 20 is actually in the cooling mode selected by controller 96, step 292 proceeds to step 294, which, as a double check, again checks timer RT. Timer RT should exceed 15 minutes, as determined by step 280, but step 294 performs a re-check, and if step RT finds that timer RT has not reached 15 minutes, step 294 proceeds to the hereinbefore described step 282. When step 294 finds that timer RT has equaled or exceeded the selected 15 minute time value, step 296 sets an alarm code CCC, which alarm code indicates to authorized personnel that the cooling capacity of unit 20 should be checked. A visible alarm icon on display 125 is also flashed.

Step 296 then proceeds to step 298 which compares the value of timer RT with a predetermined higher value, such as 30 minutes, with the time value in step 298 being selected as the time beyond which unit 20 should not be operated with seriously deficient cooling capacity. When step 298 finds that timer RT has not reached 30 minutes, step 298 returns to step 282, to give unit 20 the opportunity to reach the applicable ΔT. Should unit 20 not reach the applicable ΔT within 30 minutes, unit 20 should be shut down, and step 298 proceeds to set a mandatory shut-down alarm code LCC, which code results in unit 20 being shut down without re-start. A visible alarm on display 125 is also illuminated steadily, or flashed, as desired, and the shutdown of unit 20 may optionally be communicated to a remote location, in those instances when unit 20 is operating unattended.

Should step 292 find unit 20 is not operating in the cooling mode selected and initiated by controller 96, step 302 checks the value of a counter COUNT stored in RAM 124, to determine if the counter has reached a mandatory shut down count, such as 2 or 3, for example. A shut down count of 2 has been selected to explain the program of FIG. 8. At this point, the value of COUNT will be 0, and step 302 proceeds to step 304 which determines if the value of COUNT is 1. Since the value of COUNT is 0, step 304 proceeds to step 306 which sets COUNT to 1. Step 306 then proceeds to step 308 which stops unit 20 and sets an alarm code OHN, indicating that unit 20 is in an ALERT NULL, with the cause of the ALERT NULL being over-heat. An alarm icon on display 125 may also be continuously illuminated, or flashed, as desired.

Shutting unit 20 down for a predetermined period of time, such as 15 minutes, equalizes the pressure on opposite sides of the piston 37 in three-way valve 31, which may cause valve 31, if stuck, to free itself. The length of the ALERT NULL is timed by a null timer NT.

Step 308 proceeds to step 312, which activates null timer NT. Timer NT may be set to 15 minutes and decremented to 0, or started at 0 and incremented to 15 minutes, as desired. For purposes of example, it will be assumed that a predetermined value V1 is stored in timer NT, e.g., 15 minutes, and step 314 decrements timer NT each time program 230 is subsequently run, as the "yes" branch of step 244 is directed to step 314 when program 278 initiated the ALERT NULL mode. Unit 20 may be re-started during any ALERT NULL mode by other supervisory programs, such as a program shown in the hereinbefore mentioned U.S. Pat. No. 5,140,826, due to low battery voltage or low engine coolant temperature, for example.

Step 316 checks the value of null timer NT after each decrementing step, exiting at program return 286 until null timer NT has been decremented to 0, at which point step 318 starts unit 20. Timer RT is initialized in step 320, and step 322 clears the alarm codes. The value of COUNT, however, is not reset. Step 324 then initiates a very important step in an attempt to free three-way valve, if still stuck, with step 324 pulsing three-way valve by energizing and then de-energizing pilot solenoid PS a predetermined number of times. For example, step 324 may pulse pilot solenoid PS 10 times, at a rate of 2 seconds "on" and 2 seconds "off".

Should three-way valve 31 remain stuck in the heat position, step 304 will be reached again, and now finding that COUNT has a value of 1, step 304 branches to step 326 which sets COUNT to 2. Steps 308 through 324 will now be repeated, stopping unit 20 for an ALERT NULL, restarting unit 20 after the ALERT NULL, and again pulsing three-way valve 31 with on and off pressure changes in an attempt to enable three-way valve 31 to switch to the cooling position.

If this second start of unit 20 due to the overheating condition is not successful in switching unit 20 to the cool mode, the load in conditioned space 21 is protected from any further heating by unit 20, by shutting unit 20 down without restart, until examined by authorized personnel. Thus, should step 302 be reached with the value of COUNT equal to 2, indicating unit 20 has already been stopped and re-started twice, step 302 branches to step 328 which shuts unit 20 down by logging mandatory shutdown alarm code OH, which will indicate to authorized personnel that unit 20 was shut down due to an over-heating condition. An appropriate alarm icon on display 125 is also steadily illuminated, or flashed. Step 328 then proceeds to program return 286.

Figure 9:
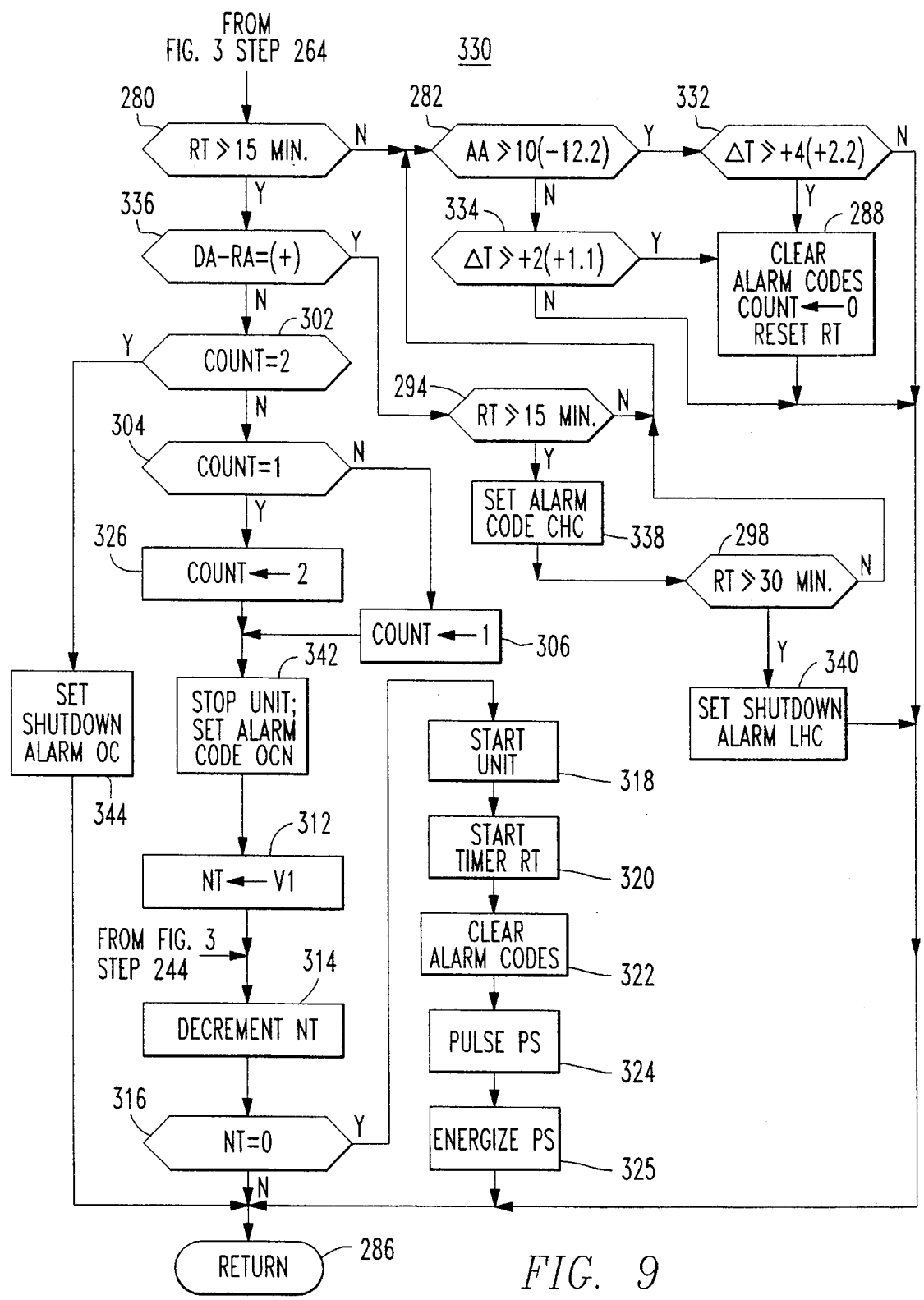
FIG. 9 is a flow diagram of a diagnostic program selected by the program selector shown in FIG. 3 when a fresh load is being conditioned and the controller is requesting a heating cycle.

When selector program 230 finds a fresh load and finds that controller 96 is requesting the heat mode, step 264 advances to program 330 shown in FIG. 9. Steps in FIG. 9 which are identical to like positioned program steps in FIG. 8 are given the same reference numbers as in FIG. 8, and will not be described again in detail. Steps in FIG. 9 which are new, or which are in the same program positions as steps in FIG. 8, but are modified to accommodate the requested heating mode, are given new numbers and will be described in detail.

A first difference in program 330, compared with program 278, is in the values of ΔT which indicate satisfactory system heating capacity. With an ambient temperature AA equal to, or above 10° F. (−12.2° C.), a difference value of +4 Fahrenheit or +2.2 Celsius, is used in a step 332, which corresponds to the program position of step 284 in FIG. 8. With an ambient temperature AA below 10° F. (−12.2° C.), a difference value of +2 Fahrenheit, or +1.1 Celsius, is used in a step 334, which corresponds to the program position of step 290 in FIG. 8.

Another difference in program 330, compared with program 278, is in the test used in a step 336, which corresponds to the program position of step 292 in FIG. 8. The question in step 336 is: is the algebraic sign of ΔT positive?; or, does the temperature DA of the discharge air exceed the temperature RA of the return air? It the answer is "yes", unit 20 is in the requested heating mode, and step 336 proceeds to step 294. If the answer is "no", unit 20 is not heating, and step 336 proceeds to step 302.

The remaining differences between program 330 and program 278 relate to alarm codes which are set. Step 338, which corresponds to the program position of step 296 in FIG. 8, sets an alarm code CHC, which indicates "check heating capacity". Step 340, which corresponds to the program position of step 300 in FIG. 8, sets a mandatory shutdown alarm code LHC, indicating "low heat capacity". Step 342, which corresponds to the program position of step 308 in FIG. 8, sets an alarm code OCN, indicating over-cooling is the cause of an ALERT NULL operating mode. Step 344, which corresponds to the program position of step 328 in FIG. 8, sets a mandatory shutdown alarm code OC, which indicates that the cause of the mandatory shutdown was over-cooling.

Step 325 is a new step, added following the pulsing step of 324, with step 325 energizing pilot solenoid PS after the step of pulsing PS, since controller 96 is requesting the heating mode, requiring energization of pilot solenoid PS.

Figure 10:
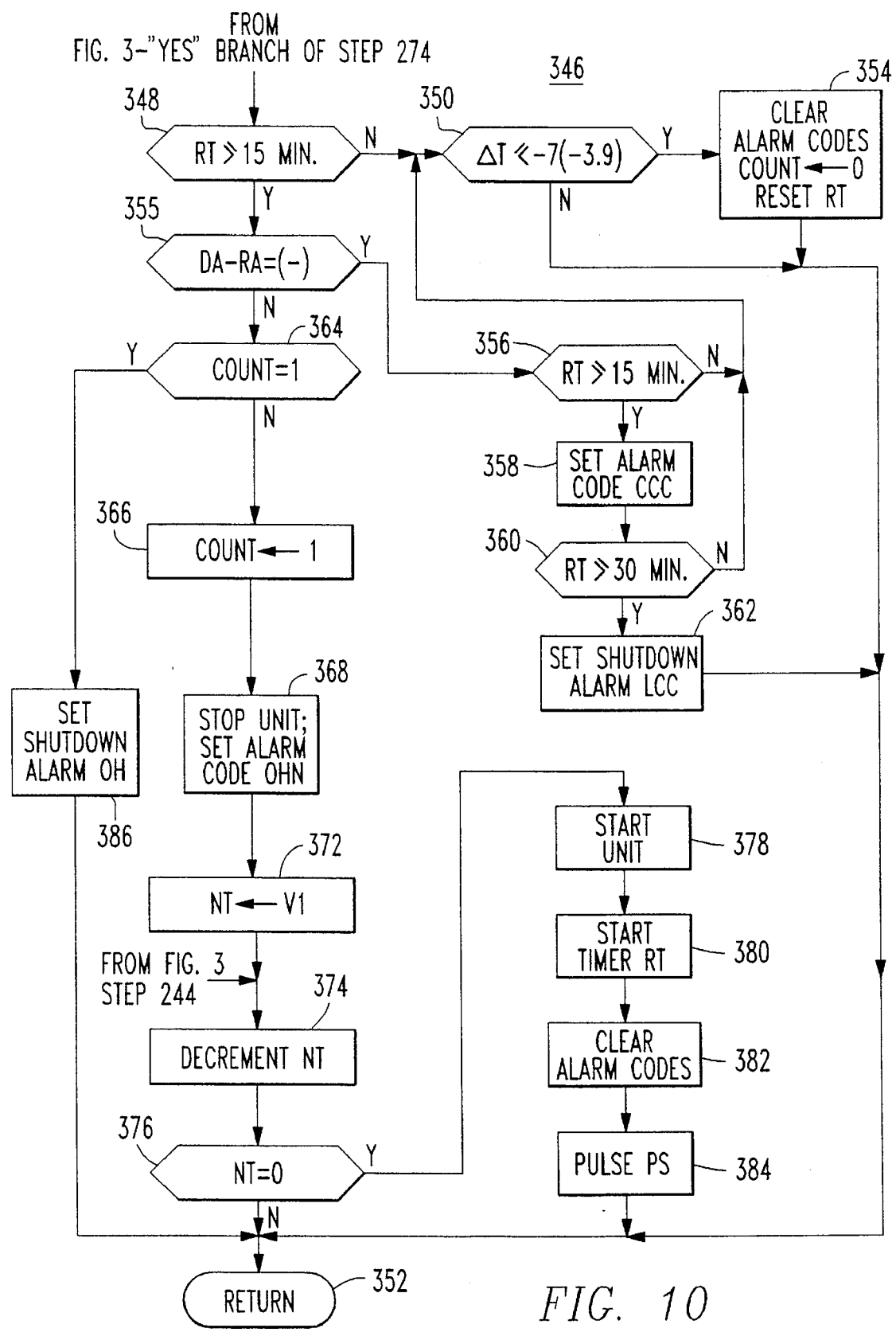
FIG. 10 is a flow diagram of a diagnostic program selected by the selector program shown in FIG. 3 when a frozen load is being conditioned, the controller is requesting a cooling mode, the temperature AA of the ambient air is above a predetermined temperature, and the temperature RA of the return air is above a predetermined temperature.

When program 230 of FIG. 3 finds (1) a frozen load is being conditioned in conditioned space 21, (2) controller 96 is requesting the cool mode, (3) the ambient air temperature AA is equal to, or above 10° F. (−12.2° C.), and (4) the temperature RA of the return air 88 is equal to, or above, 20° F. (−6.7° C.), step 274 proceeds to a diagnostic program 346 in FIG. 10. While many of the steps of FIG. 10 are similar to those hereinbefore described relative to FIG. 8, all of the steps of FIG. 10 will be described. However, since the rational behind similar steps will also be similar, the rational will not be repeated with the same detail.

Step 348 of program 346 checks timer RT, and when the value is less than 15 minutes, step 350 determines if the value of ΔT has dropped to a value of −7, or less, when Fahrenheit is used, or to a value of −3.9 when Celsius is used. When RT has a small value, ΔT will not have dropped to this value, and step 350 proceeds to program return 352. When step 350 finds that ΔT has dropped to the value of step 350 before timer RT reaches 15 minutes, it indicates that unit 20 has adequate cooling capacity and step 350 goes to step 354 which clears any set alarm codes, it resets COUNT to 0, and it resets timer RT. Step 354 then proceeds to program return 352.

Should step 348 find that timer RT has been allowed to reach 15 minutes, step 355 determines if the problem is low cooling capacity, or failure of three-way valve 31 to switch from heat to cool, as requested by controller 96. Step 355 may determine this by determining if the algebraic sign of ΔT is negative; or, if temperature DA of the discharge air 92 is less than the temperature RA of the return air 88. If the answer is "yes", unit 20 is actually in the requested cool mode, and step 356 re-checks timer RT. If timer RT has not reached 15 minutes, step 356 returns to step 350. If step 348 is confirmed, that timer RT has reached or exceeded 15 minutes, step 358 sets the alarm code CCC, which indicates cooling capacity of unit 20 should be checked. Step 358 then proceeds to step 360, which determines if timer RT has reached 30 minutes. When timer RT has not reached 30 minutes, step 360 returns to step 350. Should timer RT reach 30 minutes, it indicates that normal cooling capacity has not been reached during this time, and step 362 logs the mandatory shutdown alarm code LCC, which shuts unit 20 down without re-start, and it illuminates an alarm icon on display 125.

Should step 354 find that unit 20 is not cooling, step 364 checks counter COUNT. For purposes which will be hereinafter explained, the shutdown count in this diagnostic program which will shut unit 20 down is selected to lower than the value of the shutdown count used in the other diagnostic programs. Since a shutdown count of 2 was selected in the other programs, a shutdown count of 1 is selected in this program. If a shutdown count of 3 had been selected in the other programs, for example, a shut-down count of 1 or 2 could be used in this program. Thus, step 364 determines if COUNT has a value of 1. If unit 20 has not been shut down once, COUNT will be 0, and step 366 will advance to step 366 which sets the value of COUNT to 1. Step 368 stops unit 20 and an alarm code OHN is logged, which indicates that unit 20 is in an ALERT NULL mode, due to an over heating condition. Step 372 activates null timer NT. Step 374 updates null timer NT, with the "yes" branch of step 244 of FIG. 3 also proceeding to step 374 when program 346 initiated the ALERT NULL mode. Step 376 determines when the null period has expired, returning to program return 352, until finding that the time has been reached to re-start unit 20.

When the null period has expired, step 376 goes to step 378 which starts unit 20, step 380 initializes timer RT, step 382 clears any stored alarm codes, and step 384 pulses pilot solenoid 384, as hereinbefore described relative to step 324 in FIG. 8.

If three-way valve 31 remains stuck in the heat position, program 346 will again reach program step 364, which will now find that the value of counter COUNT is 1. In this event, step 364 branches to step 386 which logs mandatory shutdown alarm code OH, which shuts unit 20 down, indicating an over-heating condition as the cause. Unit 20 is only restarted once, with a frozen load stuck in a heating mode, instead of twice, as was the case with a fresh load. The reason for this is because a frozen load is usually not loaded until the container temperature has been pulled down to the selected set point temperature SP, and with the temperature RA of the return air 88 already equal to, or above, 20° F. (−6.7° C.), damage to the product will be less with only one re-start.

Figure 11:
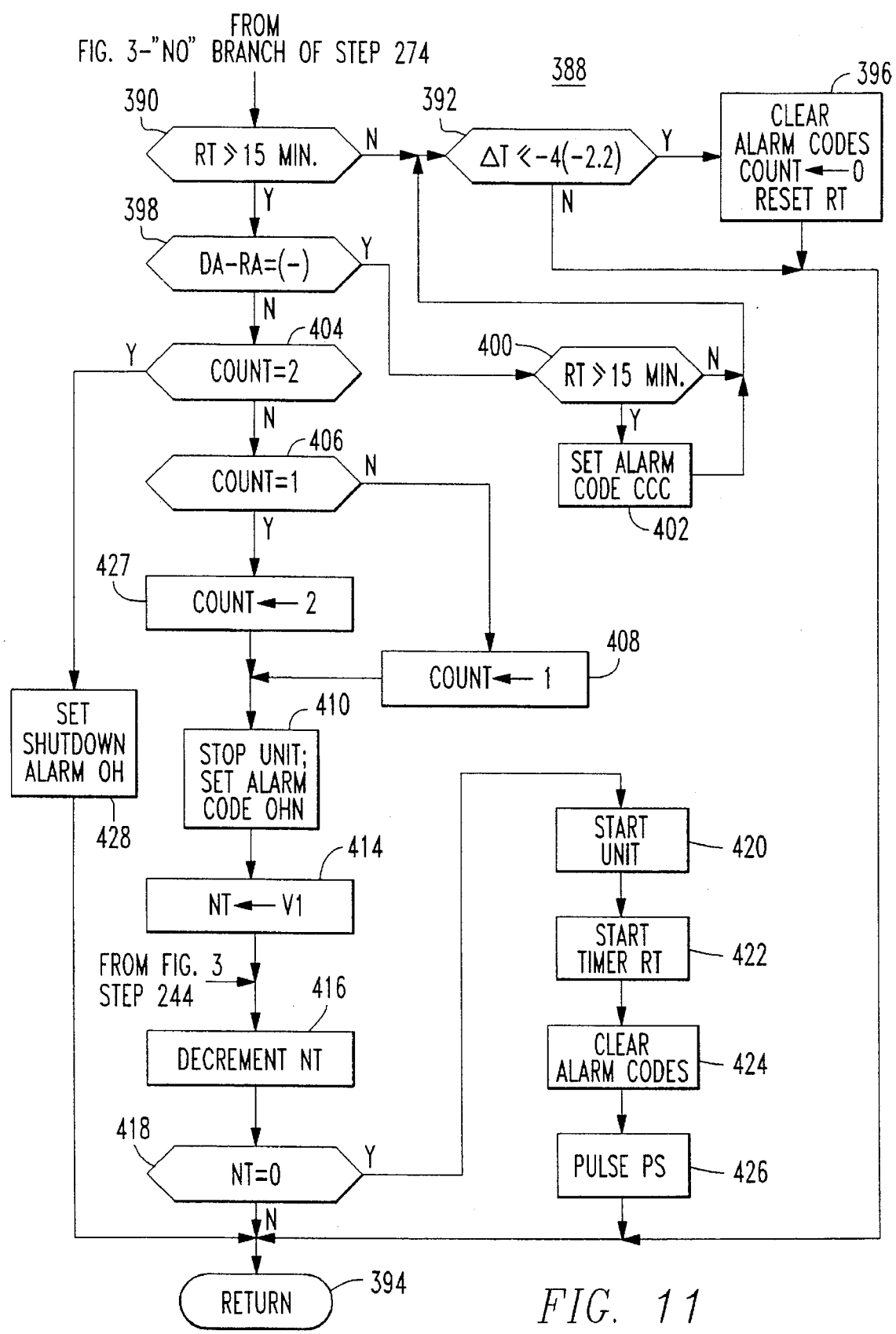
FIG. 11 is a flow diagram of a diagnostic program selected by the selector program shown in FIG. 3 when a frozen load is being conditioned, the controller is requesting a cooling mode, the temperature AA of the ambient air is above a predetermined temperature, and the temperature RA of the return air is below a predetermined temperature.

When program 230 of FIG. 3 finds (1) a frozen load is being conditioned in conditioned space 21, (2) controller 96 is requesting the cool mode, (3) the ambient air temperature AA is equal to, or above 10° F. (−12.2° C.), and (4) the temperature RA of the return air 88 is below 20° F. (−6.7° C.), step 274 proceeds to a diagnostic program 388 in FIG. 11. Many of the steps of FIG. 11 are similar to those described relative to FIG. 10, but the fact that the temperature RA of the return air 88 is below 20° F. (−6.7° C.) does not require mandatory shutdown due to low cooling capacity, and more than one re-start may be attempted when the three-way valve 31 is stuck in the heating position. With low cooling capacity, the temperature RA of the return air will eventually reach 20° F. (−6.7° C.), and then diagnostic program 346 of FIG. 10 will be used, instead of program 388 of FIG. 11, with program 346 providing a mandatory shut down for low cooling capacity, as hereinbefore described.

Program 388 is entered at step 390, which checks timer RT. When timer RT is less than 15 minutes, step 390 proceeds to step 392 which determines if the ΔT indicates that unit 20 has adequate cooling capacity. Since the temperature RA of the return air 88 is less than 20° F. (−6.7° C.), ΔT is compared with a value of −4 when Fahrenheit is used, or −2.2 when Celsius is used, which is a lower difference value than used when the temperature RA of the return air 88 is above 20° F. (−6.7° C.). Should ΔT reach the difference value of step 392 before timer RT reaches 15 minutes, the cooling capacity of unit 20 is adequate and step 396 clears any alarm codes which may have been set, it resets the value of counter COUNT, and it resets timer RT.

Should timer RT reach 15 minutes, step 398 determines if the problem is low cooling capacity or three-way valve 31 being stuck in the heating position. When the algebraic sign of ΔT is negative, ie., the temperature DA of the discharge air 92 is less than the temperature RA of the return air 88, unit 20 is actually in the requested cooling mode, and step 400 re-checks timer RT. If timer RT is less than 15 minutes, step 400 returns to step 392. If timer RT is equal to, or greater than 15 minutes, step 402 sets the alarm code CCC, which indicates cooling capacity should be checked. Step 402 returns to step 392, with the steps which shut down unit 20 due to low cooling capacity being eliminated in program 388, as hereinbefore mentioned.

Should step 398 find unit 20 is not cooling, step 404 determines if unit 20 has already been re-started twice by this program, by determining if counter COUNT has a value of 2. In this instance COUNT will have a value of 0, and step 406 determines if COUNT has a value of 1. Since COUNT will be 0, step 406 goes to step 408 which sets COUNT to 1. Step 410 stops unit 20, setting alarm code OHN, which indicates that unit 20 is in an ALERT NULL mode, due to an over-heating condition. Steps 416 and 418 determine when the null time has expired, and when the null time has expired, step 420 re-starts unit 20, step 422 initializes timer RT, step 424 clears any stored alarm codes, and step 426 pulses pilot solenoid PS, as hereinbefore described relative to step 324 in FIG. 8.

Should three-way valve 31 continue to be stuck in the heat position, step 406 will be reached again, and finding the value of COUNT is 1, step 427 sets COUNT to 2, and unit 20 is again shut down and re-started, following the steps 410 through 426. Should three-way valve 31 remain stuck in the heat position, step 404 will again be reached, and step 404 will branch to step 428 which sets the mandatory shutdown alarm OH, shutting unit 20 down while indicating the cause of the shutdown as being an over-heating condition.

Figure 12:
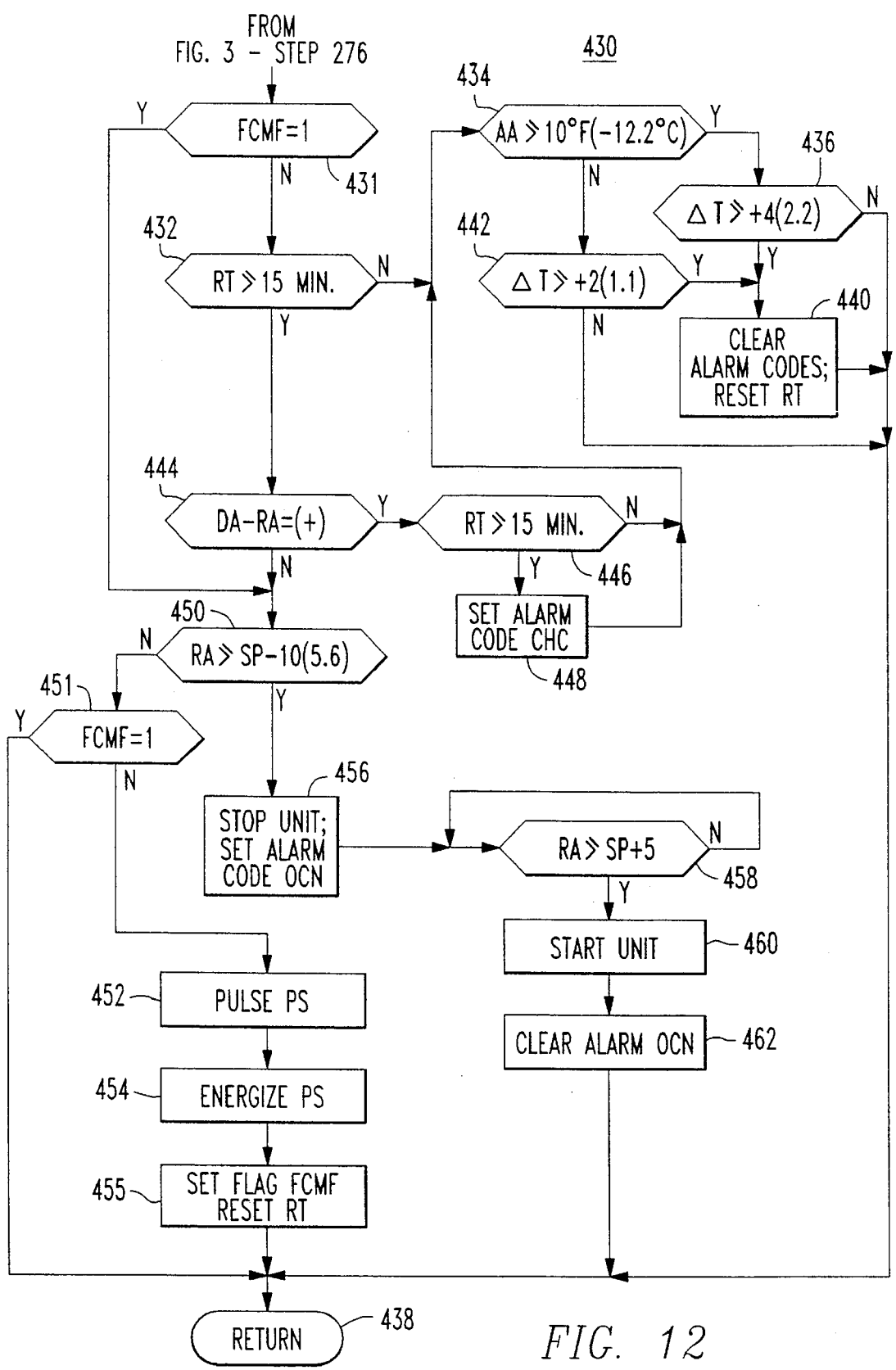
FIG. 12 is a flow diagram of a diagnostic program selected by the selector program shown in FIG. 3 when a frozen load is being conditioned and the selector is requesting a heating mode.

When the select program 230 of FIG. 3 finds (1) a frozen load is being conditioned, (2) controller 96 is requesting a heating mode, and (3) heat has not be locked out or disabled, program 230 selects program 430 shown in FIG. 12. Program 430 is entered at step 431, which checks a forced cycle mode flag FCMF, which is set by program 430 when it forces unit 20 into a predetermined cycle mode. At this point, flag FCMF will be reset, and step 431 advances to step 432, which checks timer RT. When the value of timer RT is less than 15 minutes, step 434 checks the temperature AA of the ambient air. When the ambient temperature AA is equal to, or exceeds 10° F. (−12.2° C.), step 436 compares ΔT with +4 when Fahrenheit is used, and with +2.2 when Celsius is used, to determine if unit 20 has adequate cooling capacity. When the value of AA is less than 10° F. (−12.2° C.), step 442 compares ΔT with a lesser value, such as +2 when Fahrenheit is used, and +1.1 when Celsius is used. Should the desired ΔT be reached before timer RT reaches 15 minutes, step 440 clears any alarm codes which may have been set, timer RT is reset, and program 430 is exited at return 438.

Should timer RT reach or exceed 15 minutes, step 444 determines if the algebraic sign of ΔT is positive, ie., the temperature DA of the discharge air 92 exceeds the temperature RA of the return air 88. If the algebraic sign of ΔT is positive, unit 20 is in the hot gas heating conditioning mode selected by controller 96. When unit 20 is heating, as requested, step 446 re-checks timer RT. If timer RT has not actually reached 15 minutes, step 446 returns to step 434. If timer RT has reached, or exceeded 15 minutes, step 448 sets alarm code CHC, which indicates the heating capacity should be checked. Since the ΔT is so low, it is not necessary to shut unit 20 down due to low heating capacity.

If step 444 finds that unit 20 is stuck in the cool mode, step 444 advances to step 450 which determines if the temperature RA of the return air 88 is equal to, or greater than set point SP minus 10, when Fahrenheit is used, or minus 5.6 when Celsius is used. When the answer is "no", step 451 determines if a flag FCMF has been set. At this point, flag FCMF will be reset and step 452 pulses pilot solenoid 452, as hereinbefore described, and step 464 energizes pilot solenoid PS, in an attempt to unstick three-way valve 31. Step 455 sets flag FCMF and resets timer RT. If this attempt by step 452 fails to unstick three-way valve 31, step 451 will now find flag FCMF set and advance to program return 438. Thus, the temperature RA of the return air will continue to fall due to unit 20 being stuck in the cooling mode, until step 450 finds the temperature RA of the return air 88 has fallen below set point SP by the amount indicated in step 450.

when the "yes" branch of step 450 is reached, operation of unit 20 in a cycling mode is forced, regardless of the selection position of selector switch 174. Step 456 stops unit 20 and sets the alarm code OCN, indicating that unit 20 is in an ALERT NULL mode, and that the reason is an over-cooling condition. The alarm icon on display 125 is flashed. Step 456 then proceeds to step 458 which provides a program loop until the temperature RA of the return air has risen to a differential of 5° F. (2.8° C.) above set point SP. When the temperature RA of the return air 88 reaches this value, step 460 starts unit 20 and step 462 clears alarm OCN.

Step 462 then proceeds to the program return 438, without pulsing pilot solenoid PS. In this instance pulsing is not desired since it is already known that three-way valve 31 is not working properly, as the pulsing step 352 failed to correct the problem. Thus, program 430 will not give the three-way valve 31 a chance to get stuck in the heat position. With three-way valve 31 stuck in the cool position, the SP temperature of the conditioned load may be adequately maintained by the forced cycling mode, cycling between the values selected in steps 450 and 458. Each time program 430 is entered, step 431 will now find the forced cycling mode flag 431 set, branching immediately to step 450.

We claim:

1. A method of monitoring and protecting a transport refrigeration unit and a load in a load space to be conditioned by circulating air between the load space and the transport refrigeration unit, with the transport refrigeration unit maintaining a selected set point temperature SP in the load space by electrical control which selects cooling and hot gas heating conditioning modes initiated by switching a three-way valve to first and second positions, comprising the steps of:

detecting the temperature DA of air discharged into the load space by the transport refrigeration unit, detecting the temperature RA of air returning to the transport refrigeration unit from the load space, detecting a request by the electrical control to change conditioning modes, providing a predetermined time delay, determining the actual conditioning mode of the transport refrigeration unit after the predetermined time delay in response to the current values of DA and RA, comparing the actual conditioning mode with the requested conditioning mode to determine if the actual conditioning mode is consistent with the requested conditioning mode, and pulsing the three-way valve in response to the comparison step finding that the actual conditioning mode is inconsistent with the requested conditioning mode.

2. The method of claim 1 including the steps of:

stopping the transport refrigeration unit in response to the comparison step finding that the actual conditioning mode is inconsistent with the requested conditioning mode, and re-starting the transport refrigeration unit after a predetermined time delay, with the step of pulsing the three-way valve following the step of re-starting the transport refrigeration unit.

3. The method of claim 2 including the step of generating a predetermined alarm during the time delay between the stopping and re-starting steps.

4. The method of claim 2 including the steps of:

providing a predetermined time delay after the step of re-starting the transport refrigeration unit, determining the actual conditioning mode of the transport refrigeration unit after the predetermined time delay, comparing the actual conditioning mode with the requested conditioning mode to determine if they are consistent, providing a predetermined value COUNT, repeating the steps of stopping the transport refrigeration unit, re-starting the transport refrigeration unit, pulsing the three-way valve, providing a time delay, determining the actual conditioning mode, and comparing the actual conditioning mode with the requested conditioning mode, each time the comparison step finds that the actual conditioning mode is inconsistent with the requested conditioning mode, until the number of times the transport refrigeration unit has been re-started reaches the predetermined count value COUNT, providing a predetermined time delay when the number of times the transport refrigeration unit has been re-started is equal to the value COUNT, determining the actual conditioning mode of the transport refrigeration unit after the predetermined time delay, comparing the actual requested conditioning mode with the requested conditioning mode to determine if they are consistent, stopping the transport refrigeration unit when the comparison step finds that the actual conditioning mode is still inconsistent with the requested conditioning mode, and blocking re-starting of the transport refrigeration unit.

5. The method of claim 4 including the step of generating a predetermined alarm when the transport refrigeration unit is stopped and re-starting has been blocked by the blocking step.

6. The method of claim 4 including the steps of:

comparing the selected set point temperature with a predetermined temperature value to determine whether the load in the load space is a fresh load or a frozen load, determining whether the electrical control is requesting a heating or a cooling conditioning mode, comparing the temperature RA with a predetermined value when the electrical control is requesting a cooling cycle and the load in the load space is a frozen load, and providing a lower value for the predetermined value COUNT when the temperature RA is at or above the predetermined value COUNT than when the temperature RA is below the predetermined value COUNT.

7. The method of claim 1 including the steps of:

comparing the selected set point temperature with a predetermined temperature value to determine whether the load in the load space is a fresh load or a frozen load, and determining whether the electrical control is requesting a heating or a cooling conditioning mode, with the pulsing step being implemented prior to any stopping of the transport refrigeration unit, when the electrical control is requesting a heating cycle, the load in the load space is a frozen load, and the actual conditioning mode is inconsistent with the requested conditioning mode.

8. The method of claim 7 including the steps of:

providing a predetermined time delay after the pulsing step, determining the actual conditioning mode of the transport refrigeration unit after the predetermined time delay, comparing the actual conditioning mode with the requested conditioning mode to determine if they are consistent, and forcing the transport refrigeration unit to operate in a start-stop cycling mode between first and second predetermined temperature limits, in response to the comparison step finding that the actual conditioning mode is still inconsistent with the requested conditioning mode.

9. The method of claim 1 including the steps of:

determining the temperature differential $\Delta T$ between the temperatures DA and RA during the predetermined time delay, detecting the temperature AA of the ambient air, providing a predetermined value for comparison with $\Delta T$, selecting the magnitude of the predetermined value in response to the conditioning mode requested by the electrical control and the temperature AA, comparing the differential $\Delta T$ with the selected predetermined value, and resetting the predetermined time delay when differential $\Delta T$ equals or exceeds the selected predetermined value before the expiration of the predetermined time delay.

10. The method of claim 9 including the step of generating a predetermined alarm after the predetermined time delay when the comparison step finds the actual conditioning mode is consistent with the requested conditioning mode, with the generating step including the step of indicating that the capacity of the transport refrigeration unit in the requested conditioning mode should be checked.

11. The method of claim 9 including the steps of:

starting a second time delay after the expiration of the predetermined time delay when the comparison step finds the actual conditioning mode is consistent with the requested conditioning mode, continuing the steps of determining the temperature differential $\Delta T$ between the temperatures DA and RA and comparing the differential $\Delta T$ with the selected predetermined value during the second predetermined time delay, stopping the transport refrigeration unit at the end of the second time delay in the event the $\Delta T$ does not reach the selected predetermined value during the second time delay, and blocking restarting of the transport refrigeration unit when the transport refrigeration is stopped after the second time delay.

12. The method of claim 1 wherein the three-way valve is operated by pressure, and including the step of connecting the three-way valve to a predetermined location of the transport refrigeration unit via a conduit which includes an electrically operated valve, such that when the electrically operated valve opens the conduit the three-way valve is acted upon by the refrigerant pressure of the predetermined location of the transport refrigeration unit to operate the three way valve from the first position to the second position, and when the electrically operated valve closes the conduit the three-way valve is operated from the second to the first position, with the step of pulsing the three-way valve including the steps of energizing and de-energizing the electrically operated valve for predetermined intervals, and repeating the energizing and de-energizing steps a predetermined number of times.

* * * * *